(12) United States Patent
Stanze

(10) Patent No.: US 8,625,746 B2
(45) Date of Patent: *Jan. 7, 2014

(54) SYSTEM AND METHOD TO PUSH MESSAGES INDICATING STATUS OF TROUBLE REPORTS IN A TELECOMMUNICATIONS NETWORK

(71) Applicant: AT&T Intellectual Property I, L.P., Reno, NV (US)

(72) Inventor: Richard Stanze, Manchester, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,177

(22) Filed: Apr. 10, 2013

(65) Prior Publication Data

US 2013/0287182 A1 Oct. 31, 2013

Related U.S. Application Data

(63) Continuation of application No. 13/563,463, filed on Jul. 31, 2012, now Pat. No. 8,422,638, which is a continuation of application No. 12/113,198, filed on Apr. 30, 2008, now Pat. No. 8,254,528.

(60) Provisional application No. 60/947,932, filed on Jul. 3, 2007.

(51) Int. Cl.
*H04M 1/24* (2006.01)
*H04M 3/08* (2006.01)
*H04M 3/22* (2006.01)

(52) U.S. Cl.
USPC .......... 379/9.03; 379/9.02; 379/9.04; 714/48; 714/57

(58) Field of Classification Search
USPC ............... 379/9.02, 9.03, 9.04, 14.01, 15.01, 379/15.02, 15.03, 15.04; 714/46, 48, 49, 714/51, 57
See application file for complete search history.

(56) References Cited

U.S. PATENT DOCUMENTS

| | | |
|---|---|---|
| 5,416,833 A | 5/1995 | Harper et al. |
| 5,491,742 A | 2/1996 | Harper et al. |
| 5,619,562 A | 4/1997 | Maurer et al. |
| 5,644,619 A | 7/1997 | Farris et al. |
| 5,687,212 A | 11/1997 | Kinser, Jr. et al. |
| 5,774,689 A | 6/1998 | Curtis et al. |
| 5,790,633 A | 8/1998 | Kinser, Jr. et al. |
| 5,790,634 A | 8/1998 | Kinser, Jr. et al. |
| 5,881,131 A | 3/1999 | Farris et al. |
| 5,920,846 A | 7/1999 | Storch et al. |
| 5,953,389 A | 9/1999 | Pruett et al. |
| 6,516,055 B1 * | 2/2003 | Bedeski et al. ............ 379/32.01 |
| 6,687,335 B1 | 2/2004 | Jones et al. |
| 6,990,186 B2 | 1/2006 | Thacker |
| 7,006,603 B2 | 2/2006 | Boetje et al. |
| 7,099,942 B1 | 8/2006 | Wilson et al. |
| 7,184,414 B2 | 2/2007 | Taylor et al. |

(Continued)

*Primary Examiner* — Binh Tieu
(74) *Attorney, Agent, or Firm* — Jackson Walker L.L.P.

(57) ABSTRACT

A system, method, and media for managing messages, comprising a status push application in communication with a trouble ticket database and a work force administration and control system, the status push application being enabled to detect a status change for a trouble ticket associated with the trouble ticket database and further enabled to selectively push a message to one or more external and potentially non-compatible systems in response to detecting the status change.

19 Claims, 4 Drawing Sheets

(56) References Cited

U.S. PATENT DOCUMENTS

| | | |
|---|---|---|
| 7,224,787 B1 | 5/2007 | Smith et al. |
| 7,340,038 B2 | 3/2008 | Boetje et al. |
| 7,469,282 B2 | 12/2008 | Taylor |
| 7,568,020 B2 | 7/2009 | Bagsby |
| 7,596,214 B2 | 9/2009 | Smith et al. |
| 7,818,631 B1 | 10/2010 | Halikhedkar et al. |
| 7,920,983 B1 | 4/2011 | Peleg et al. |
| 7,929,668 B2 | 4/2011 | Boetje et al. |
| 7,945,817 B1 | 5/2011 | Usery et al. |
| 7,974,386 B2 | 7/2011 | Lutz et al. |
| 8,041,799 B1 | 10/2011 | Usery et al. |
| 2004/0062359 A1 | 4/2004 | Jones et al. |
| 2004/0114523 A1 | 6/2004 | Taylor et al. |
| 2004/0143653 A1 | 7/2004 | Taylor et al. |
| 2004/0179654 A1 | 9/2004 | Boetje et al. |
| 2004/0192205 A1 | 9/2004 | Bagsby |
| 2004/0203953 A1 | 10/2004 | Thacker |
| 2006/0182230 A1 | 8/2006 | Boetje et al. |
| 2007/0133755 A1 | 6/2007 | Jean et al. |
| 2007/0165818 A1 | 7/2007 | Savoor et al. |
| 2008/0043960 A1 | 2/2008 | Smith et al. |
| 2008/0097780 A1* | 4/2008 | Boetje et al. ............ 705/1 |
| 2008/0201471 A1 | 8/2008 | Medlock |
| 2009/0103544 A1 | 4/2009 | Taylor et al. |
| 2009/0217097 A1 | 8/2009 | Laperi et al. |
| 2009/0259510 A1 | 10/2009 | Bagsby |

* cited by examiner

| TROUBLE TICKET NO. (171-1) | CIRCUIT ID (171-2) | TIME/DATE (171-3) | FUNCTION CODE (171-4) |
|---|---|---|---|
| ACCESS CARRIER (171-5) | MAJOR CUSTOMER (171-6) | CUST CARRIER (171-7) | ACCOUNT NAME (171-8) |
| REPORT CATEGORY(171-9) | REPORT DATE/TIME(171-10) | ACCOUNT ADDRESS (171-11) | TROUBLE TYPE (171-12) |
| REPORTED BY (171-13) | CARRIER CONTACT PHONE (171-14) | RESOLVED TIME (171-15) | ACTUAL RESTORED DATE/TIME (171-16) |
| PREMISE "A" ADDRESS (171-17) | PREMISE "Z" ADDRESS (171-18) | REPORTED TROUBLE (171-19) | ANALYSIS CODE (171-20) |
| SERVICE ADDRESS (171-21) | SERVICE NAME (171-22) | CENTER (171-23) | DISPATCH CENTER (171-24) |
| CURRENT COMMIT DATE/TIME (171-25) | ACCESS FROM (171-26) | ACCESS TO (171-27) | SPECIAL STUDY (171-28) |
| CIRCUIT ACCESS CODE (171-29) | DISPOSITION CODE (171-30) | CAUSE CODE (171-31) | FUNCTION LEVEL CODE (171-32) |

SYSTEM AND METHOD TO PUSH MESSAGES INDICATING STATUS OF TROUBLE REPORTS IN A TELECOMMUNICATIONS NETWORK

The present patent application is a continuation of U.S. patent application Ser. No. 13/563,463, filed Jul. 31, 2012; which claims priority to U.S. patent application Ser. No. 12/113,198, filed Apr. 30, 2008; which claims priority to U.S. Provisional Patent Application Ser. No. 60/947,932, filed Jul. 3, 2007, the entirety of which are all hereby incorporated by reference.

FIELD OF THE DISCLOSURE

The present disclosure relates generally to telecommunication systems and networks.

BACKGROUND OF THE DISCLOSURE

The Public Switched Telephone Network (PSTN) is a well known and ubiquitous communications network for individuals and businesses. It is desirable to efficiently administer installation, repair, and other services that are performed on a network such as the PSTN.

BRIEF DESCRIPTION OF THE DRAWINGS

FIG. 2 is a conceptual representation of an exemplary status message suitable for use with the network of FIG. 1;

DETAILED DESCRIPTION OF THE DRAWINGS

Figure 1:
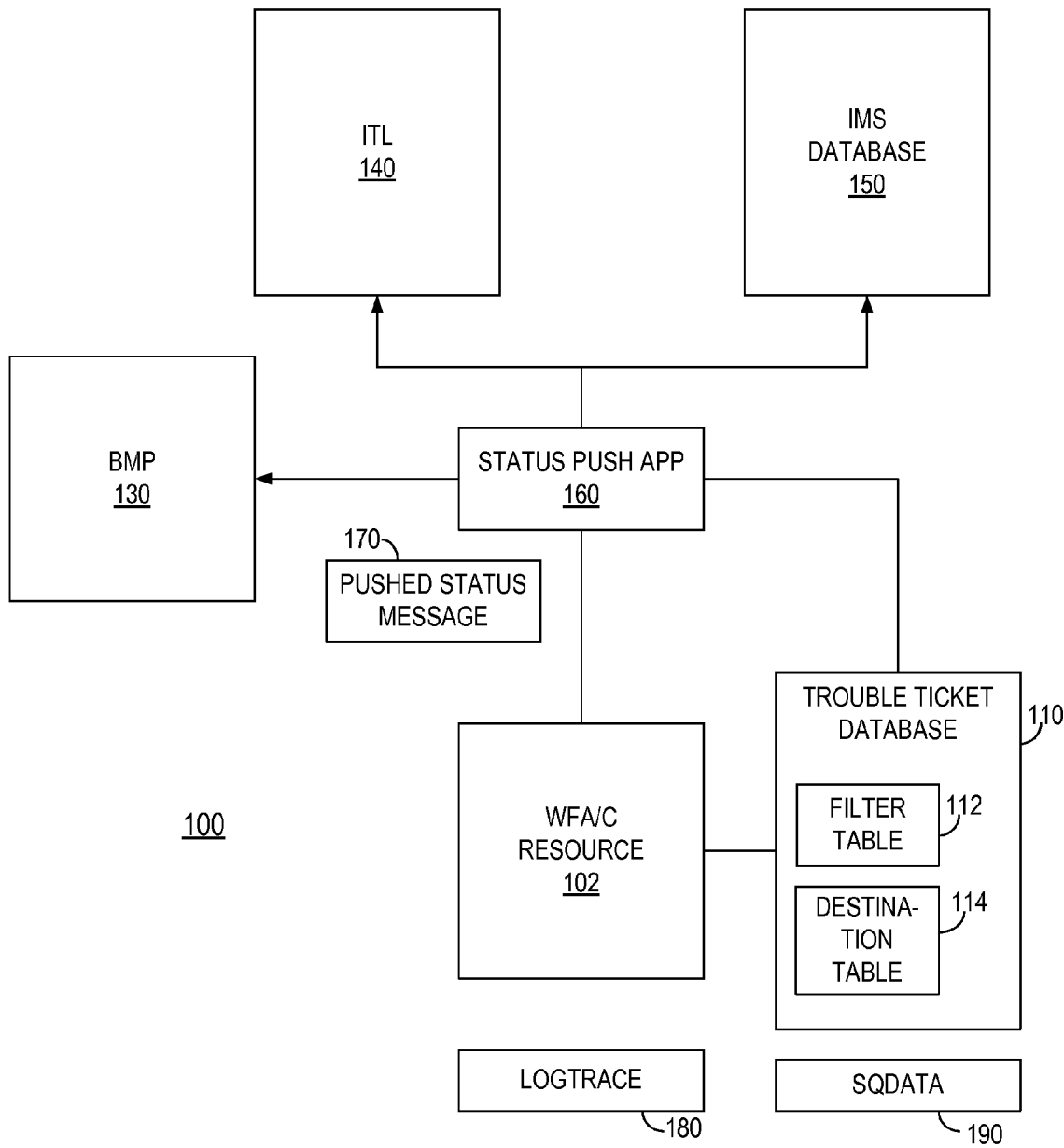
FIG. 1 is a block diagram illustrating selected elements of an embodiment of a telecommunications network including disparate workforce and trouble report administration resources and an application to push status messages to one or more of the systems.

In one aspect, a method to push notification to external systems when specified events have taken place on a trouble report (TR) in a telecommunications network is disclosed. In some embodiments, the disclosed notification may includes "pushing" status messages to administrator-specified destinations. In some embodiments, push notification is done selectively on only a portion of TR events. TR events suitable for pushing to external systems might be filtered by various administrator-specified fields or filters. Messages might, for example, be pushed for only specified TR events, for TR events originating from specified maintenance center(s), based on a field that indicates by whom the event was reported for, or based on a telecommunications circuit, which may be indicated, for example, by circuit format values.

In one aspect, a TR status push application, which may be implemented as computer software stored on a computer readable medium of a data processing system, is disclosed. In some embodiments, the TR status push application enables an administrator or other user to identify, via a Trouble Ticket Status (TTS) or other form of database table, TR Events that will initiate a status push message. A database table, referred to herein as a filter table, will be provided within a trouble ticket database or in another database to identify TRs that are eligible for status push messages. In some embodiments, the filter table has a table key for event type and table record key or keys for maintenance center and circuit ID. A destination table may be provided to enable an administrator to specify one or more destinations that are to receive status push messages.

In some embodiments, the status push messages are fixed layout messages. The status push messages may include any or all of the following data fields (when the fields are present on the corresponding TR):

Trouble Ticket Number
Circuit ID
Date, Time and WFA System Time Zone
Function Code
Access Carrier Name Abbreviation
Major Customer Number
Customer Carrier Name Abbreviation
Account Name
Report Category
Report Date & Time
Account Address
Trouble Type
Reported By
Carrier Contact Phone
Resolved Time
Actual Restored Date & Time
Premise A Location Name and Address
Premise Z Location Name and Address
Reported Trouble
Analysis Code
Service Address
Service Name
Center
Dispatch Center
Current Commitment Date/Time
Access From
Access To
Special Study
Circuit Access Code
Disposition Code
Cause Code
Function Level Code The TR status push application may also include a filter for identifying TRs that are eligible for status push messages based on the values in one or more fields of the TR. For example, the TR status push application may filter status messages based, at least in part, on a "Reported By" field that indicates the originator of the status change. In these embodiments, the filter table may, for example, filter status messages based on three fields such as a maintenance center field, a circuit ID field, and the Reported By field. The Reported By field may be an optional and "wildcardable" field. The status push message may include a report field that may be truncated to its first 25 characters.

The system may be operable to provide the TR Status Push Message in a specifiable format, e.g., an XML format. The status push application may enable the administrator to identify two or more IMS message queue destinations. The system may also be operable to enable an administrator to select "database" as a destination, in which case, the status push message may be forwarded to an IMS database, as opposed to, for example, an IMS message queue, thereby enabling leveraging of IMS Data Capture Exit architectures to send the data to locally developed repositories.

The system enables a provider to support disparate and external systems that require real-time status updates of TRs from an existing or pervasive administration system including, for example, a WFA/C system. The ability to generate messages in an XML format enables greater flexibility for handling status push messages. The ability to send status push messages to an IMS database beneficially allows the client to take advantage of a better performing interface than a IMS message queue. In addition, it helps to alleviate issues with IMS message queue sizing and availability impacts. Without this option, if message queues fill up, some status messages could be missed.

Work Force and Administration-Control (WFA/C) subsystems automate work request administration and resource administration functions to provide capability for managing installation and repair services on the PSTN. WFA/C includes Work Administration and Force Administration. Work Administration analyzes work to be done, determines resources required, manages the allocation of work to work groups, and tracks completion of work steps. Force Administration determines the availability of specific human resources, assigns specific work to craft, tracks details of work completion, reports work status, and handles inquiries on work status.

In some embodiments, the described WFA/C system may include elements of a legacy WFA/C system that was originally developed for the Bell telephone system and is now used by regional operators of the PSTN and others in the telecommunications industry. Legacy WFA/C is known to those of ordinary skill in the field of telecommunications network art and is described, for example, in U.S. Pat. No. 6,219,648 to Jones et al. entitled Apparatus and Method for Monitoring Progress of Customer Generated Trouble Tickets; U.S. Pat. No. 5,953,389 to Pruett et al. entitled Combination System for Provisioning and Maintaining Telephone Network Facilities in a Public Switched Telephone Network; U.S. Pat. No. 5,881,131 to Farris et al. entitled Analysis and Validation System for Provisioning Network Related Facilities; U.S. Pat. No. 5,790,634 to Kinser, Jr. et al. entitled Combination System for Proactively and Reactively Maintaining Telephone Network Facilities in a Public Switched Telephone System; U.S. Pat. No. 5,790,633 to Kinser, Jr. et al. entitled System for Proactively Maintaining Telephone Network Facilities in a Public Switched Telephone Network, U.S. Pat. No. 5,687,212 to Kinser, Jr. et al. entitled System for Reactively Maintaining Telephone Network Facilities in a Public Switched Telephone Network; U.S. Pat. No. 5,644,619 to Farris et al. entitled Analysis and Validation System for Provisioning a Public Switched Telephone Network; U.S. Pat. No. 5,491,742 to Harper et al. entitled Method and Apparatus for Provisioning a Public Switched Telephone Network; and U.S. Pat. No. 5,416,833 to Harper et al. entitled Method and Apparatus for Provisioning a Public Switched Telephone Network.

Referring to now FIG. 1, selected elements of a telecommunications network 100 are depicted. The depicted elements emphasize work force administration and control elements of the network 100 and an module to push status messages to various external and/or disparate systems in response to changes in TRs associated with the network.

As shown in FIG. 1, network 100 includes a work force administration and control (WFA/C) resource 102 in communication with a trouble report database or trouble ticket database 110. Trouble ticket database 110 includes, in addition to trouble reports generated or administered by WFA/C 102, a filter table 112, and a destination table 114. Although tables 112 and 114 are shown as residing in the trouble ticket database 110, they may reside in different systems or databases in other embodiments.

Network 100 as shown in FIG. 1 includes multiple disparate and external resources that may rely on or be used in conjunction with the administration of trouble tickets. The use of two or more disparate administration systems within an enterprise may occur, for example, when two enterprises are merged. Each of the administration systems may be pervasively installed or distributed across the network such that it may be impracticable or infeasible to simply migrate to a single system.

In the depicted embodiment, network 100 includes, in addition to WFA/C 102, a Business Maintenance Platform (BMP) 130. In some embodiments, BMP 130 is a system maintenance platform for local and voice related business. Network 100 as shown further includes a database or system referred to as Integrated Ticket List (ITL) 140 that is operable to contain trouble ticket information from disparate systems. In addition, network 100 as shown includes an IMS database 150. ITL 140 may be implemented with a database technology that is different than the database technology of IMS Database 150. In some embodiments, for example, the ITL 140 is an Oracle® compliant database.

A status push application 160 is shown as being connected to the WFA/C 102, trouble ticket database 110, and the external systems and databases, including BMP 130, ITL 140, and IMS database 150. Status push application 160 is operable, at least in part through its access to WFA/C 102 and trouble ticket database 110, to detect changes in the status of trouble tickets residing in database 110. Status push application 160 is further operable to select or filter the TR status changes that occur and to generate status messages 170 and "push" the messages 170 to one or more external systems including BMP 130, ITL 140, and/or IMS database 150. Although FIG. 1 depicts a single pushed status message 170, it should be appreciated that status push application 160 is operable to generate a message 170 formatted in compliance with each destination to the extent that the different destinations require different formats for incoming messages.

Also shown in FIG. 1 are a logtrace resource 180 and an SQDATA 190 that may operate in conjunction with WFA/C 102 and/or trouble ticket database 110 to report or detect status changes to existing trouble tickets and/or to create new trouble tickets.

Referring to FIG. 2, an exemplary format for status push message 170 is depicted. In the depicted embodiment, status push message 170 includes 32 fields, 171-1 through 171-32. Fields 171 as shown include a trouble ticket number field 171-1 that is indicative of the trouble ticket or trouble report in database 110 to which the message pertains. Various other fields define or indicate other characteristics of the status message including a Reported By field 171-13, a function code 171-4, and a circuit ID 171-2. Any or all of the fields 171 may be used to filter messages for forwarding to external systems. For example, in some circumstances, it may not be necessary to forward all status messages to BMP 130 and status push application 160, in conjunction with filter table 112, is operable to provide for such filtering.

Accordingly, status push application 160 is operable to selectively identify trouble ticket status changes that are to be forwarded. Filter table 112 may include a table key for the type of status change, and table record keys or reported by field 171-13, center field 171-23, and/or circuit ID code 171-2. In addition, status push application 160 is operable to consult user configurable destination table 114 to determine one or more destination systems to which a status push message is to be sent. Destination table 114 may indicate any or all of the external systems/database shown in FIG. 1 as well as other systems/databases that are not shown.

In some embodiments, status push application 160 receives status change messages from WFA/C 102 and selectively forwards the received messages to external systems as status push messages 170. In other embodiments, status push application 160 is operable to actively monitor trouble ticket database 110 and WFA/C 102 to detect changes in status reports regardless of whether a status change message is sent to it.

Figure 3:
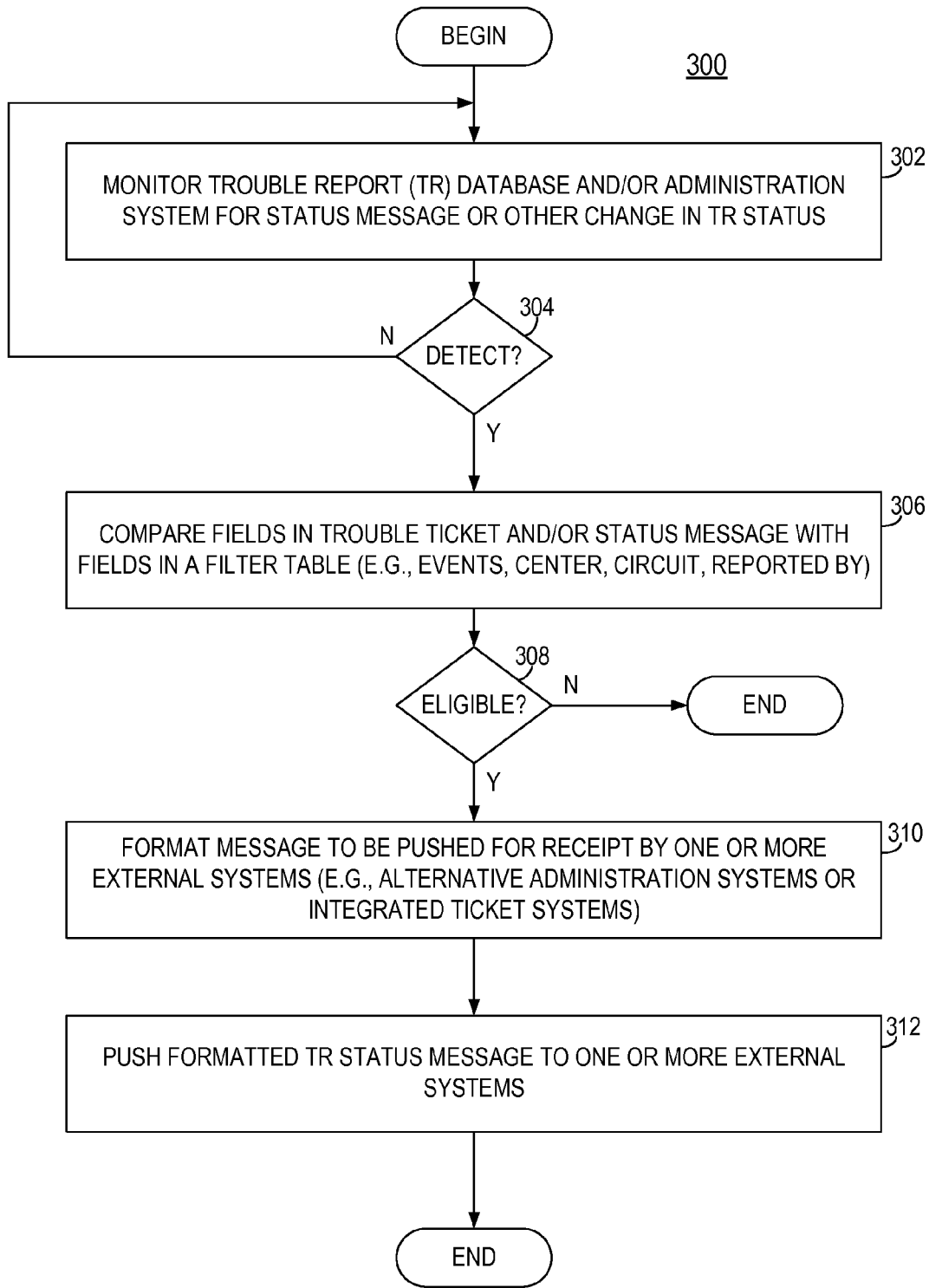
FIG. 3 is a flow diagram illustrating selected elements of an embodiment of a method of pushing status messages to external resources in a telecommunications network.

Referring to FIG. 3, a method 300 of handling status change messages in a telecommunications network is shown. In the depicted embodiment, method 300 includes monitoring (block 302) a trouble report database and/or an administration system, e.g., WFA/C 102, for status message changes or other changes in TR status. When a status change is detected (block 304), method 300 as shown includes determining whether the detected status change needs to be pushed out to an external system. In the depicted embodiment, for example, method 300 includes comparing (block 306) fields in the trouble ticket and/or status message from WFA/C 102 with fields in a filter table to determine whether the applicable trouble ticket and/or status change is eligible or required to be forwarded to an external system. If the trouble ticket and/or status message is not eligible (block 308) for forwarding, method 300 terminates. If, however, the trouble ticket or status change is eligible to be reported, method 300 as shown includes formatting (block 310) a message to be pushed to an external system. Determination of the destination may be based on a field in a destination table in the trouble ticket database or elsewhere. The format of the pushed message may be an XML format, a proprietary or legacy format, or another suitable format. In embodiments suitable for use with FIG. 1, for example, method 300 may include pushing (block 312) a properly formatted message to an IMS database and to an integrated ticket list.

Method 300 and status push application 160, as well as other elements of FIG. 1, may be implemented as computer software or computer database structures which may include computer executable instructions or computer readable data stored on a computer readable medium of a data processing system. When the data processing system (not depicted) executes the instructions, the instructions cause the data processing system to perform method 300. The data processing system, or any portion thereof, may operate as a standalone device or may be connected, e.g., using a network, to other computer systems or peripheral devices.

In a networked deployment, the data processing system may operate in the capacity of a server or as a client user computer in a server-client user network environment, or as a peer computer system in a peer-to-peer (or distributed) network environment. The data processing system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the data processing system can be implemented using electronic devices that provide voice, video or data communication. Further, while a single data processing system is described, the term "system" shall also be taken to include any collection of systems or sub-systems that individually or jointly execute a set, or multiple sets, of instructions to perform one or more computer functions.

Figure 4:
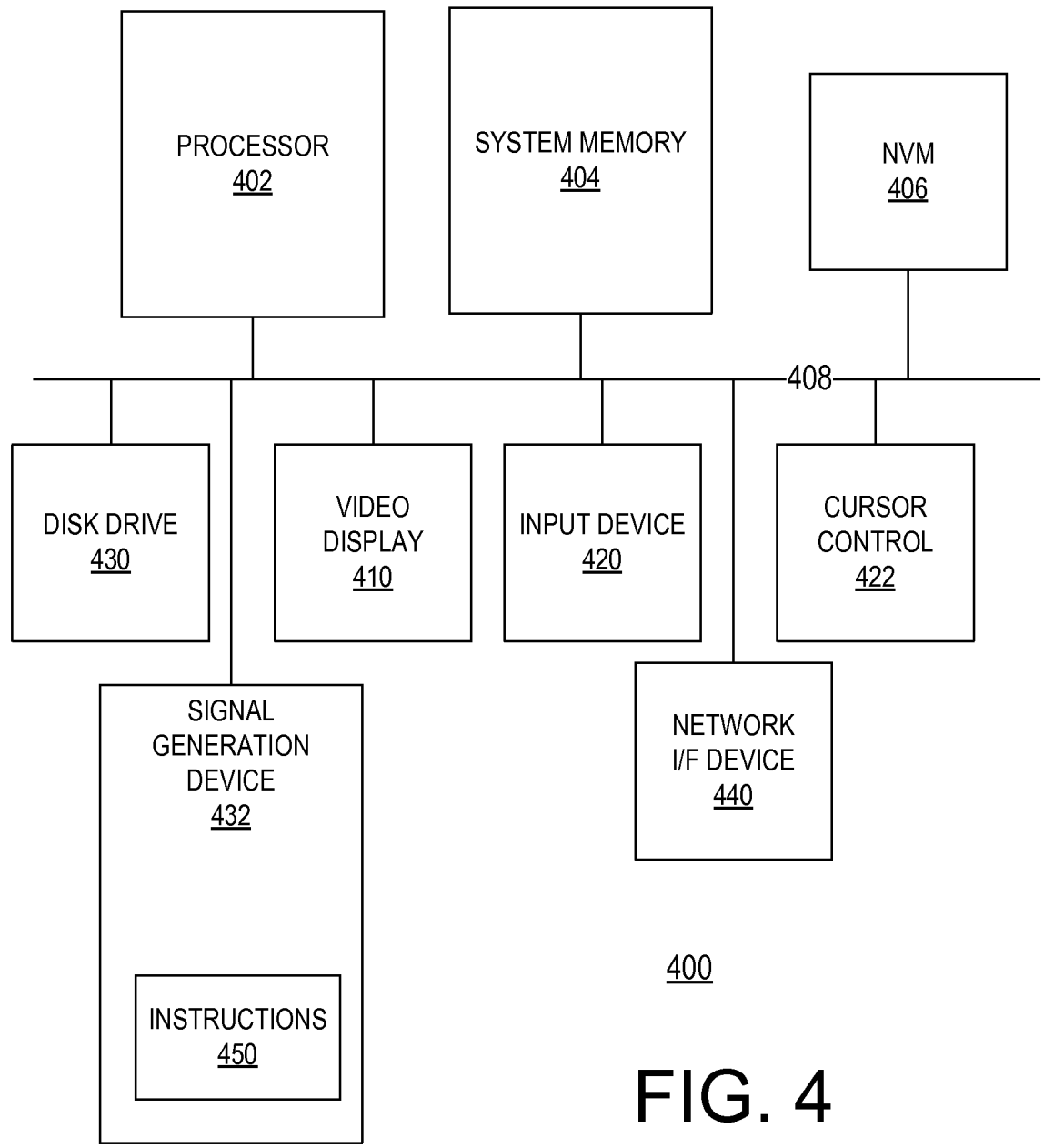
FIG. 4 is a block diagram of selected elements of an embodiment of a data processing system suitable for storing and executing a software implementation of the status push application of FIG. 1.

Referring to FIG. 4, selected elements of an embodiment of a data processing system 400 for hosting or otherwise executing all or portions of status push application 160 are depicted. In the depicted embodiment, data processing system 400 includes a processor 402, e.g., a central processing unit (CPU), a graphics processing unit (GPU) (not depicted), or both. Moreover, the data processing system 400 as shown includes a system memory 404 and a persistent or nonvolatile memory (NVM) 406 that can communicate with each other via a bus 408. Data processing system 400 may further include a video display unit 410, such as a liquid crystal display (LCD), an organic light emitting diode (OLED), a flat panel display, a solid state display, or a cathode ray tube (CRT). Additionally, the data processing system 400 may include an input device 420, such as a keyboard, and a cursor control device 422, such as a mouse. Data processing system 400 may also include a disk drive unit 430, a signal generation device 432, such as a speaker or remote control, and a network interface device 440.

In a particular embodiment, disk drive unit 430 may include a magnetic or other suitable form of computer-readable medium in which one or more sets of instructions 450 are embedded. Further, instructions 450 may embody one or more of the methods or logic as described herein including, as an example, the status push application 160 of FIG. 1. In some embodiments, at least some of the instructions 450 may be copied into system memory 404, NVM 406, or within a cache or other form of memory within processor 402.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer readable memory including processor executable program instructions that, when executed by a processor, cause the processor to perform operations comprising:
   responsive to receiving a status change message for a trouble ticket, comparing a field in the status change message with a field in a filter table; and
   when the comparing results in a match, pushing the status change message to a plurality of resources.

2. The computer readable memory of claim 1, wherein entries in the filter table include an event field indicative of an event producing the status change of the trouble ticket, a circuit field indicative of a circuit associated with the trouble ticket, and a reported-by field identifying an originator of the status change message.

3. The computer readable memory of claim 1, wherein pushing the status change message includes formatting the status change message in compliance with an extensible markup language format.

4. The computer readable memory of claim 1, wherein the plurality of resources include an information management system resource and a relational database resource.

5. The computer readable memory of claim 1, wherein the operations include:
   responsive to determining that the trouble ticket is an ineligible trouble ticket, not performing the comparison.

6. A message processing method, comprising:
   responsive to detecting a status change for a trouble ticket, comparing fields in an object with fields in a filter table, wherein the object is selected from: a trouble report and a status message; and
   responsive to matching a field in the object with a field in the filter table, formatting an update message for receipt by an external system.

7. The method of claim 6, wherein the fields in the object include an event field, a circuit ID field, and a reported-by field.

8. The method of claim 6, wherein formatting the update message includes formatting multiple messages and wherein the method further includes:
   sending each of the multiple messages to a corresponding external system.

9. The method of claim 6, wherein formatting the update message includes formatting the update message based on an extensible markup language document.

10. The method of claim 6, wherein the update message is indicative of the status change.

11. The method of claim 6, wherein the trouble report is derived from a trouble ticket database.

12. The method of claim 11, wherein pushing the update message includes sending the update message to a relational database.

13. The method of claim 11, wherein pushing the update message includes sending the update message to an information management system database.

14. A work force administration system, comprising:
   a processor having access to memory media, the memory media including processor executable instructions that, when executed, cause the processor to perform operations comprising:
      specifying criteria for an eligible trouble ticket; and
      responsive to detecting a status change for an eligible trouble ticket, pushing a message to a plurality of external database systems when the status change matches with a field in a filter table.

15. The system of claim 14, wherein the filter table includes a maintenance center field and a circuit identification field.

16. The system of claim 15, wherein the filter table includes a reported-by field indicative of a field technician.

17. The system of claim 14, wherein the plurality of external database systems includes an integrated ticket list accessible to an external administration system.

18. The system of claim 14, wherein the operations include specifying trouble ticket log events to push the message.

19. The system of claim 14, wherein the message is formatted as an extensible markup language database.

* * * * *